US010703256B2

(12) United States Patent
Ridler et al.

(10) Patent No.: US 10,703,256 B2
(45) Date of Patent: Jul. 7, 2020

(54) METHOD FOR REDUCING HEADLIGHT GLARE, HEADLIGHT SYSTEM AND SYSTEM CONTROLLER FOR CONTROLLING A HEADLIGHT SYSTEM

(71) Applicant: Jaguar Land Rover Limited, Coventry, Warwickshire (GB)

(72) Inventors: Nicholas Ridler, Coventry (GB); Irene Funez, Coventry (GB); Shammika Wickramasinghe, Coventry (GB)

(73) Assignee: JAGUAR LAND ROVER LIMITED, Coventry, Warwickshire (GB)

( * ) Notice: Subject to any disclaimer, the term of this patent is extended or adjusted under 35 U.S.C. 154(b) by 0 days.

(21) Appl. No.: 16/478,059

(22) PCT Filed: Dec. 13, 2017

(86) PCT No.: PCT/EP2017/082538
§ 371 (c)(1),
(2) Date: Jul. 15, 2019

(87) PCT Pub. No.: WO2018/130361
PCT Pub. Date: Jul. 19, 2018

(65) Prior Publication Data
US 2020/0114805 A1    Apr. 16, 2020

(30) Foreign Application Priority Data

Jan. 16, 2017    (GB) .................................. 1700732.9

(51) Int. Cl.
*B60Q 1/14*    (2006.01)
*G06K 9/46*    (2006.01)
(Continued)

(52) U.S. Cl.
CPC ....... *B60Q 1/1423* (2013.01); *G06K 9/00791* (2013.01); *G06K 9/4661* (2013.01);
(Continued)

(58) Field of Classification Search
CPC ............ B60Q 1/1423; B60Q 2300/054; B60Q 2300/30; G06K 9/00791; G06K 9/4661;
(Continued)

(56) References Cited

U.S. PATENT DOCUMENTS 6,254,259 B1 *   7/2001   Kobayashi ............. B60Q 1/085
                                                340/459
2008/0231195 A1   9/2008   Kobayashi et al.
(Continued)

FOREIGN PATENT DOCUMENTS

DE    102009040006 A1    3/2011
DE    102010015731 A1    10/2011
(Continued)

OTHER PUBLICATIONS

Patents Act 1977: Combined Search and Examination Report under Sections 17 and 18(3), UKIPO Application No. GB1700732.9, dated Jun. 30, 2017, 7 pp.
(Continued)

*Primary Examiner* — Don P Le
(74) *Attorney, Agent, or Firm* — Miller Nash Graham & Dunn LLP

(57) ABSTRACT

A method (100) for reducing headlight glare experienced by a user of a vehicle (10), the vehicle (10) comprising a headlight system (12) having at least one headlight (30, 32) operable to illuminate an environment external to the vehicle, the method (100) comprising: illuminating the environment external to the vehicle; obtaining (102) image data of the illuminated environment; performing (146) a first analysis of brightness values of the image data to identify reflective surfaces that may cause glare; performing (148) a second analysis of brightness values of the image data to categorise the identified reflective surfaces into at least two categories; and adjusting (149) the light output from the at
(Continued)

least one headlight (30, 32) in the direction of each identified reflective surface in dependence on the category of that reflective surface.

15 Claims, 4 Drawing Sheets

(51) Int. Cl.
  *G06T 7/73*   (2017.01)
  *H05B 47/11*  (2020.01)
  *G06K 9/00*   (2006.01)

(52) U.S. Cl.
  CPC .............. *G06T 7/73* (2017.01); *H05B 47/11* (2020.01); *B60Q 2300/054* (2013.01); *B60Q 2300/30* (2013.01); *G06T 2207/30252* (2013.01)

(58) Field of Classification Search
  CPC .. G06T 7/73; G06T 2207/30252; H05B 47/11
  USPC .......................................................... 315/82
  See application file for complete search history.

(56) References Cited

U.S. PATENT DOCUMENTS

| | | | |
|---|---|---|---|
| 2011/0006685 A1 | 1/2011 | Kraft | |
| 2012/0206050 A1* | 8/2012 | Spero | B60Q 1/1423 315/152 |
| 2013/0079983 A1 | 3/2013 | Ehlgen et al. | |
| 2014/0224961 A1* | 8/2014 | Nelson | H05B 47/11 250/206 |
| 2015/0127227 A1 | 5/2015 | Strolz et al. | |
| 2015/0294174 A1* | 10/2015 | Karkowski | G06K 9/325 382/182 |
| 2016/0023592 A1* | 1/2016 | Foltin | B60Q 1/143 701/49 |
| 2016/0025627 A1* | 1/2016 | Stopper | B60R 16/0237 356/337 |
| 2016/0185276 A1* | 6/2016 | Tanaka | B60Q 1/085 362/466 |
| 2017/0113627 A1* | 4/2017 | Ding | B60R 1/04 |
| 2017/0352275 A1* | 12/2017 | Maruyama | B60R 1/003 |
| 2019/0126812 A1* | 5/2019 | Harada | G06K 9/00791 |
| 2020/0042809 A1* | 2/2020 | Heift | G06K 9/6212 |
| 2020/0059587 A1* | 2/2020 | Pribble | G06K 9/2054 |

FOREIGN PATENT DOCUMENTS

| | | |
|---|---|---|
| EP | 2127944 A1 | 12/2009 |
| EP | 2374660 A2 | 10/2011 |
| EP | 2380774 A1 | 10/2011 |

OTHER PUBLICATIONS

International Search Report and Written Opinion of the International Searching Authority, International Application No. PCT/EP2017/082538, dated Mar. 27, 2018, 15 pp.

* cited by examiner

METHOD FOR REDUCING HEADLIGHT GLARE, HEADLIGHT SYSTEM AND SYSTEM CONTROLLER FOR CONTROLLING A HEADLIGHT SYSTEM

RELATED APPLICATIONS

This application is a 35 U.S.C. § 371 national stage application of PCT Application No. PCT/EP2017/082538, filed on Dec. 13, 2017, which claims priority from Great Britain Patent Application No. 1700732.9, filed on Jan. 16, 2017, the contents of which are incorporated herein by reference in their entireties. The above-referenced PCT International Application was published in the English language as International Publication No. WO 2018/130361 A1 on Jul. 19, 2018.

TECHNICAL FIELD

The present disclosure relates to a method for reducing headlight glare experienced by a user of a vehicle. Aspects of the invention relate to a method, a headlight system, a system controller, a computer-readable storage medium and to a vehicle incorporating the headlight system.

BACKGROUND

When driving in low light conditions, it is imperative that a driver of a vehicle is aware of an external environment. Using the headlights of the vehicle in such conditions is effective in highlighting hazards to the driver, however, some reflective objects can cause high levels of glare to the driver.

If the glare is particularly intense, the driver's vision may be impaired due to the over-exposure to light. Continual overexposure to light can result in increased driver fatigue in the short term and in eye strain in the long term. All of the above affect the ability of the driver to collect important information about their surroundings, which is an important element of driving in low light conditions.

To combat this problem, some lighting systems have attempted to reduce the problems caused by glare to the driver by adapting the headlight beam. For example, DE 1 0201 001 5731 alters the headlight beam of a vehicle based upon reflectance measured by a laser array mounted to the vehicle. Upon identification of a reflective object, the system de-illuminates the object completely.

Another similar system is US 2015/127227, which identifies a road sign based upon a camera image or known information, and reduces the light from the headlight beams upon identification.

At least in certain embodiments, the present invention has been devised to mitigate or overcome at least some of the above-mentioned problems.

SUMMARY OF THE INVENTION

Aspects and embodiments of the invention provide a method, a headlight system, a system controller, a computer-readable storage medium and a vehicle as claimed in the appended claims.

According to an aspect of the present invention there is provided a method for reducing headlight glare experienced by a user of a vehicle, the vehicle comprising a headlight system having at least one headlight operable to illuminate an environment external to the vehicle, the method comprising: illuminating the environment external to the vehicle; obtaining image data of the illuminated environment; performing a first analysis of brightness values of the image data to identify reflective surfaces that may cause glare; performing a second analysis of brightness values of the image data to categorise the identified reflective surfaces into at least two categories; and adjusting the light output from the at least one headlight in the direction of each identified reflective surface in dependence on the category of that reflective surface.

By performing two analyses, the invention beneficially categorises the surfaces identified within the environment of the vehicle. This ensures that the illumination can be adjusted to reduce glare levels to a user, but so that important information can still be obtained from the environment. Furthermore, the reduction in glare allows for a more even contrast profile across the user's field of view, reducing the potential for the user to become fatigued or to be distracted during driving.

In addition, the present invention provides an advantage over the prior art. For example, the invention ensures that the change in brightness of the light directed towards an object is related to its potential to cause glare, whereas DE 1 0201 001 5731 completely de-illuminates the object, thereby potentially removing the object from the view of the driver. If an object is completely removed from view the driver may not receive information about their surroundings which could affect their driving. Similarly, the invention differs from US 2015/127227 as the identification of a road sign in US 2015/127227 does not correspond to the different levels of reflectivity that are present in road signs. Instead, the light is reduced upon identification of a road sign regardless of the reflectivity level of the sign in US 2015/127227, and therefore, reflectivity problems may still occur. If the illumination level of US 2015/127227 is lowered too much, important information may not be seen.

The brightness values of the image data may be indicative of the intensity of light reflected from each surface.

Performing the first analysis may comprise comparing the brightness values to a first threshold.

Performing the first analysis may comprise categorising surfaces corresponding to image data having brightness values which do not exceed the first threshold into a first category corresponding to a low level of glare and categorising surfaces corresponding to image data having brightness values which do exceed the first threshold as reflective surfaces that may cause glare. The low level glare category therefore comprises all objects which reflect light at a brightness below the first threshold and also comprises all non-reflective objects. To express this another way, the term 'low level of glare' corresponds to low levels of glare and to the absence of glare.

Performing the first analysis may comprise identifying reflective surfaces that correspond to precipitation and/or self-reflection and disregarding them as reflective surfaces. Precipitation and self-reflection has the potential to cause problems and malfunction of the system, and so incorporating it advantageously improves the performance of the system. The provision of an identification feature such as this allows the operation of the system in all conditions. For example, the precipitation may be in the air, on or in front of the lens of a camera or sensor that obtains the image, or on the headlights of the vehicle themselves. Precipitation in the air will cause reflection back of light in small areas within the image, while precipitation on headlights or in front of the camera may cause errors within the image where the precipitation obscures light from being received by the camera. Fog may also influence the operation of the system.

Self-reflection is caused by the reflection of light from the body of the vehicle. For example, reflected light from a road-sign or light from a street lamp may reflect from the vehicle's bonnet and cause areas of brightness within an image that would be identified by the system as glare.

Performing the second analysis may comprise comparing the brightness values of the image data corresponding to the reflective surfaces to a second threshold.

Performing the second analysis may comprise categorising the reflective surfaces corresponding to image data having brightness values which do not exceed the second threshold into a second category corresponding to a medium level of glare and categorising the reflective surfaces corresponding to image data having brightness values which do exceed the second threshold into a third category corresponding to a high level of glare.

Adjusting the light output from the at least one headlight may comprise reducing a beam intensity of the at least one headlight by a first amount in a direction of reflective surfaces categorised into the second category, and reducing a beam intensity of the at least one headlight by a second amount in a direction of reflective surfaces categorised into the third category. The second amount may be greater than the first amount. For example, the second amount may be a reduction in the intensity of the headlight beam by 80%, with the first amount being a reduction in the intensity of the headlight beam by 50%. Any other proportional reduction in the intensity of the headlight beam would be achievable and possible within the scope of this application.

Adjusting the light output may comprise adjusting the intensity of a headlight beam. Adjusting the light output may comprise adjusting the spatial pattern of the light output.

In embodiments wherein the vehicle comprises a headlight system having more than one headlight, the method may comprise adjusting the light output from each headlight. The method may comprise adjusting the light output from each headlight in the direction of each identified reflective surface by the same amount. Alternatively, the method may comprise adjusting the light output from each headlight in the direction of each identified reflective surface by different amounts. For example, the light output from a first headlight may be adjusted by a first amount and the light output from a second headlight maybe adjusted by a second amount, the first amount being different to the second amount. In this way, the method may comprise controlling the light output from each headlight of the headlight system independent of the other headlights.

The method may comprise identifying the location of the reflective surfaces in relation to the vehicle by identifying coordinates of the corresponding brightness values within the image data.

The method may comprise correlating the identified coordinates of the brightness values with the at least one headlight.

The image data may be obtained by a camera or a sensor mounted on the vehicle. The image data may be obtained by a plurality of cameras or sensors. In this case, the image data would be analysed and any locations correlated in three dimensions.

According to another aspect of the invention, there is provided a system controller for controlling a headlight system of a vehicle to reduce glare experienced by a user of the vehicle, the system controller comprising: an input for receiving image data of an illuminated environment external to the vehicle; a processing module arranged to perform a first analysis and a second analysis of brightness values of the image data, the first analysis being performed to identify reflective surfaces that may cause glare and the second analysis being performed to categorise the identified reflective surfaces into at least two categories; a control module configured to generate output signals, the output signals being arranged to adjust the light output from at least one headlight of the headlight system in the direction of each identified reflective surface in the at least two categories, in dependence on the first and second analyses; and an output arranged to output the output signals to the at least one headlight of the vehicle.

The brightness values of the image data may be indicative of the intensity of light reflected from each surface.

The first analysis may comprise comparison by the processing module of the brightness values to a first threshold.

The first analysis may comprise categorisation by the processing module of surfaces corresponding to image data having brightness values which do not exceed the first threshold into a first category corresponding to a low level of glare and a categorisation by the processing module of surfaces corresponding to image data having brightness values which do exceed the first threshold as reflective surfaces that may cause glare.

The first analysis may comprise identification by the processing module of reflective surfaces that correspond to precipitation and/or self-reflection and whereby upon identification of reflective surfaces that correspond to precipitation and/or self-reflection, the processing module disregards them as reflective surfaces.

The second analysis may comprise a comparison by the processing module of the brightness values of the image data corresponding to the reflective surfaces to a second threshold.

The second analysis may comprise categorisation by the processing module of the reflective surfaces corresponding to image data having brightness values which do not exceed the second threshold into a second category corresponding to a medium level of glare and categorisation by the processing module of the reflective surfaces corresponding to image data having brightness values which do exceed the second threshold into a third category corresponding to a high level of glare.

The output signal may cause the at least one headlight to adjust its light output by reducing a beam intensity of the at least one headlight by a first amount in a direction of reflective surfaces categorised into the second category, and by reducing a beam intensity of the at least one headlight by a second amount in a direction of reflective surfaces categorised into the third category. The second amount may be greater than the first amount.

The processing module may be configured to identify the location of the reflective surfaces in relation to the vehicle by identifying coordinates of the corresponding brightness values within the image data.

The processing module may be configured to correlate the identified coordinates of the brightness values with the at least one headlight.

According to another aspect of the invention, there is provided a headlight system comprising at least one headlight operable to illuminate an environment external to the vehicle, and a system controller as described above.

According to another aspect of the invention, there is provided a vehicle comprising a system controller or a headlight system as described above.

According to another aspect of the invention, there is provided a computer program product downloadable from a communication network and/or stored on a machine readable medium, comprising program code instructions for implementing a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
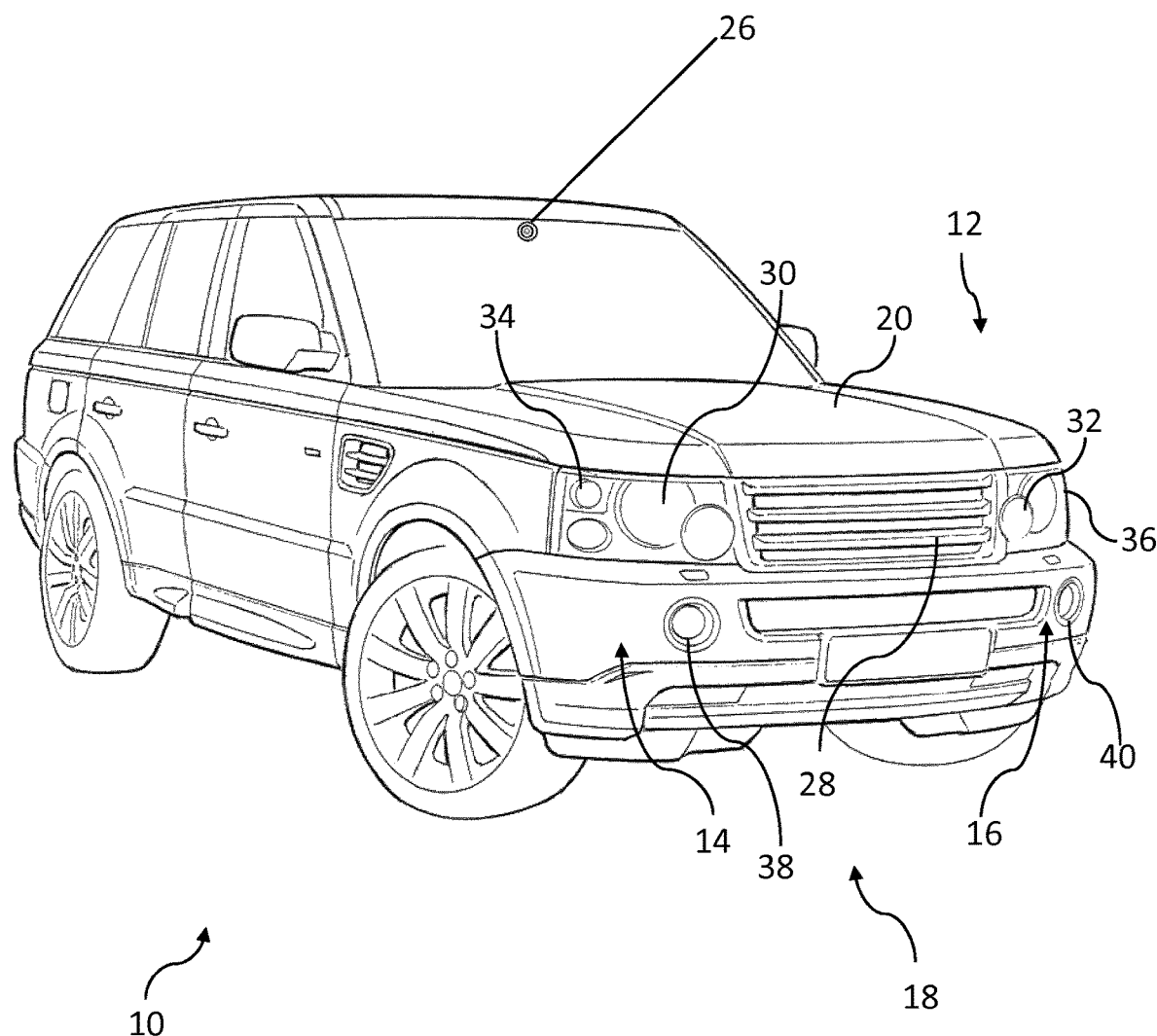
FIG. 1 is a diagram of a vehicle provided with a headlight system according to an embodiment of the invention.

FIG. 1 is a diagram of a vehicle 10 provided with a lighting system 12 according to an embodiment of the invention. The vehicle 10 incorporates a front right headlight set 14 and a front left headlight set 16 disposed on opposing sides of a front end 18 of the vehicle 10, below a hood cover 20 of the vehicle 10.

The vehicle 10 also includes at least one on-board forward facing camera 26, positioned in the front end 18 of the vehicle 10, to capture images of an external environment surrounding the front end 18 of the vehicle 10. The forward facing camera 26 in the vehicle 10 of FIG. 1 is centrally positioned in the vicinity of a rear view mirror (not shown), although it is known to incorporate the camera 26 in other positions on the vehicle 10 such as behind a central grille 28 or on the dashboard (not shown) of the vehicle 10. Alternative imaging or sensing means may also be incorporated into the vehicle to capture images or data relating to the external environment.

Each headlight set 14, 16 comprises a main headlight 30, 32, an indicator light 34, 36 and a fog lamp 38, 40. The main headlight 30, 32 comprises a light emitting diode (LED) array (not shown) comprising a plurality of individually controllable LEDs, which are operable to illuminate the surroundings of the vehicle 10 during low light conditions such as at night or when the vehicle 10 enters a tunnel. As the LEDs are individually controllable, the distribution of the light radiated by the LED array, and therefore the main headlights 30, 32, can be tailored to the external environment. As part of or when combined with the lighting system 12, or when used as part of a method for reducing glare, as described herein, the LED array eliminates glare experienced by a user of the vehicle 10, which will be described in more detail below.

In other embodiments of the invention, the main headlight may comprise lighting arrays that incorporate lighting elements other than LEDs but whose lighting elements are still individually controllable. For example, the main headlight may comprise a micro electromechanical system (MEMS) based headlight comprising a localised light source, optionally a laser, the light output from which can be controlled and scanned across the environment external to the vehicle through movement of a MEMS mirror to create the headlight beam. Alternatively, the main headlight may comprise a Digital Light Processing (DLP) system. These and other appropriate pixelated headlight systems are envisaged to be used in systems and methods of the present invention.

The main headlights 30, 32 are configured to operate in one of at least two modes: dipped beam mode or full beam mode. Dipped beam mode illuminates the road adequately in front of the user to allow safe driving in low light conditions, and is normally used in situations wherever other road users are or may be present ahead.

In contrast, full beam mode is intended for use when there are no other road users in the immediate vicinity, and is an intense, centre-weighted distribution of light. The intensity of the light from the main headlights 30, 32 in full beam mode may dazzle other road users.

Figure 2:
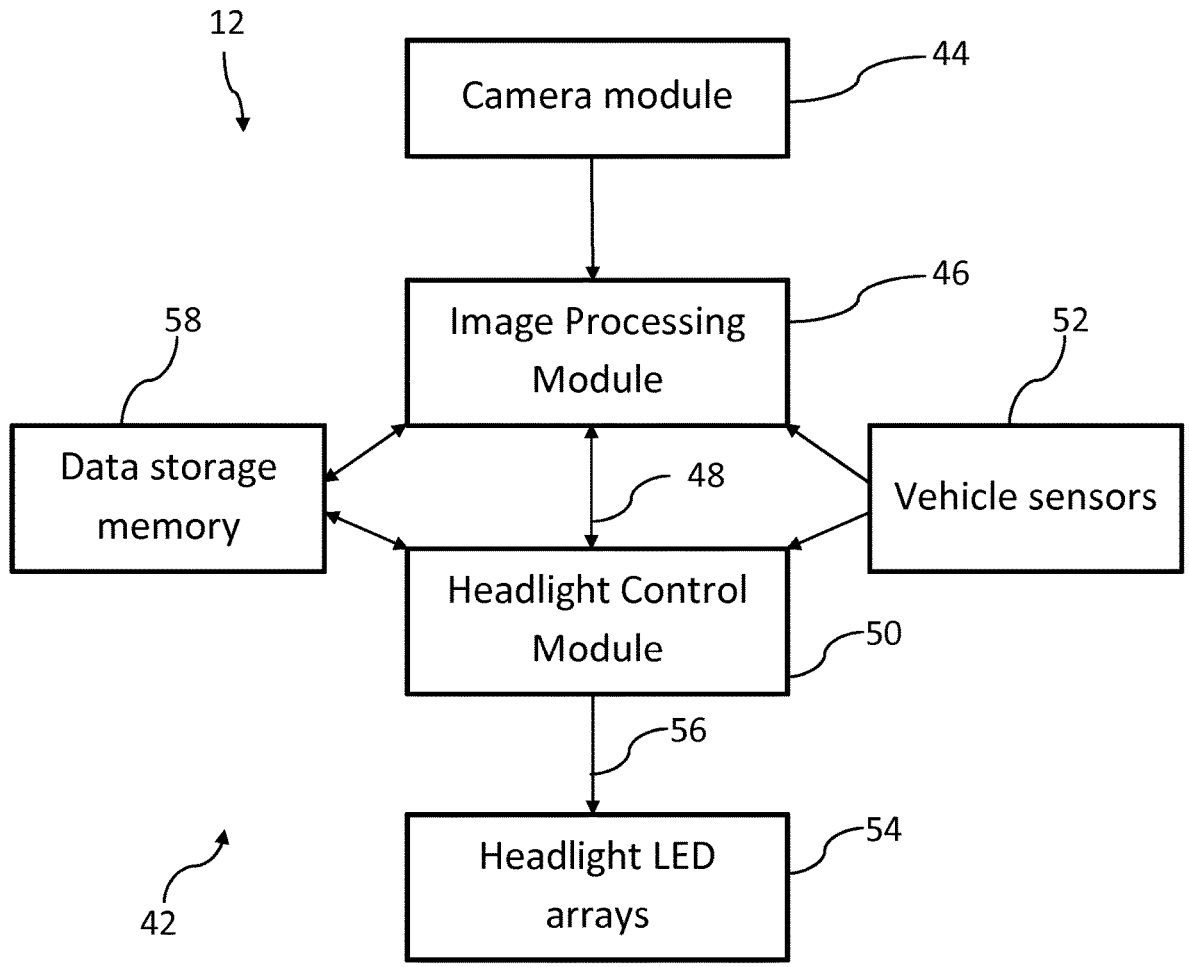
FIG. 2 is a schematic block diagram of a headlight system that may be installed in the vehicle of FIG. 1.

As mentioned above, the vehicle 10 of FIG. 1 incorporates a lighting system 12. A schematic example diagram of a system architecture 42 for said lighting system 12 is shown in FIG. 2. The lighting system 12 is for use when the main headlights 30, 32 are being operated in any mode.

The lighting system 12 reduces the amount of glare experienced by a user of the vehicle 10. The glare results from light radiated by the main headlights 30, 32 being reflected back to the user from highly reflective objects. In reducing the glare, the system 12 reduces the likelihood of impairment of the user's vision without completely removing the highly reflective object from the user's sight or losing important information or clarity of the highly reflective object. The incorporation of the lighting system 12 may allow the user to operate the vehicle 10 in full beam mode for a longer period of time, without the need to manually switch between headlight modes to adapt to different situations. Additionally, the lighting system 12 may allow a raised headlight beam angle that would not ordinarily be used in conventional systems and may allow the incorporation of a number of different modes that adapt to different situations.

Considering FIG. 2, the lighting system 12 system architecture 42 comprises a camera module 44 in communication with an image processing module 46. Image data obtained by the camera module 44 is processed by the image processing module 46 to assess the glare being reflected back at the vehicle 10 user using image processing techniques in order to identify reflective areas and the positions of those reflective areas in the field of view of the camera 26 (not shown in FIG. 2).

The image processing module 46 is capable of communicating 48 commands to and receiving information from a headlight control module 50. The headlight control module 50 converts commands received from the image processing module 46 into output signals 56 that correspond to changes in the intensity and/or distribution of light radiated by the LED array 54 of each main headlight 30,32.

One or more vehicle sensors 52 may optionally provide additional sensing information to the image processing module 46 or to the headlight control module 50 that may be used in the generation of the output signals 56. These vehicle sensors 52 may comprise, for example, a speedometer, a steering angle sensor, a yaw rate sensor or a user input sensor that the user activates to change the headlight configuration from dipped beam to full beam mode.

In some embodiments of the invention, the image processing module 46, headlight control module 50 and/or a data storage memory 58 may be incorporated into a single system controller.

The headlight control module 50 implements the commands received from the image processing module 46 by mapping or correlating the positions of reflective areas to the LED arrays 54. Using the correlation, the headlight control module 50 creates a corresponding output signal 56 for each LED array 54 to effect a reduction in the glare experienced by the user by reducing the intensity and/or distribution of light in the direction of the identified reflective areas.

Both the image processing module 46 and the headlight control module 50 are in communication with a data storage memory 58. The memory 58 stores thresholds corresponding to glare levels as well as operational conditions of the system 12. The memory 58 is writable by either of the image processing module 46 or the headlight control module 50 to update thresholds or to store information relating to navigational geography.

Figure 3:
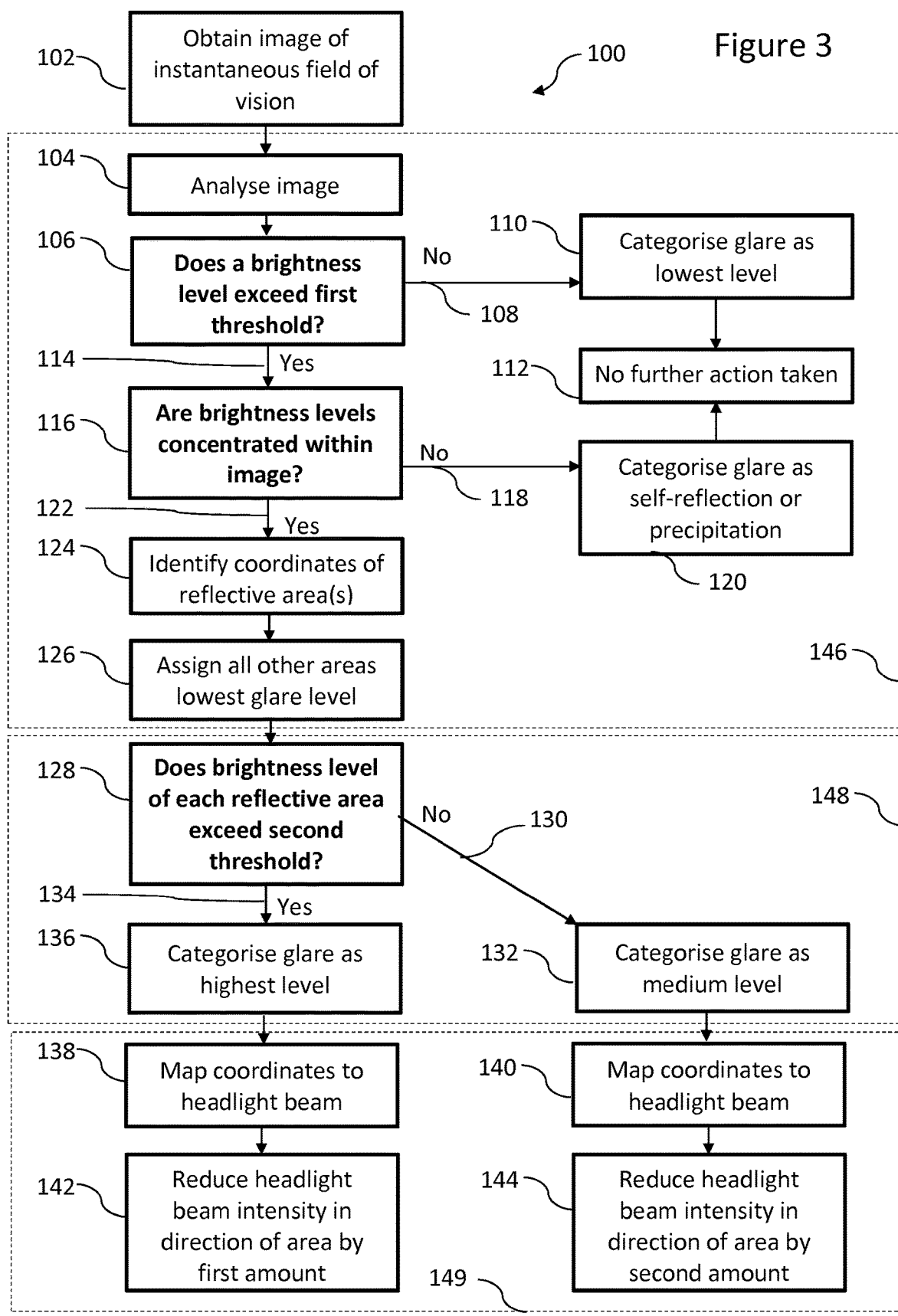
FIG. 3 is a flow chart illustrating a method of operation of the headlight system of FIG. 2.

FIG. 3 shows a method 100 governing the operation of the lighting system 12. It is envisaged that the lighting system 12 is operated according to the method 100 of FIG. 3 during any use of the headlights 30, 32, although it would also be possible to operate the lighting system 12 according to the method 100 of FIG. 3 only when changing the main headlights 30, 32 from dipped beam mode to full beam mode.

At a first step 102 of the method 100, image data is obtained by the camera module 44 of the external environment of the vehicle 10, and therefore in the field of view of the vehicle user. From the image data, reflective areas corresponding to objects or parts of objects in the external environment can be identified.

The obtained image data is received by the image processing module 46, which analyses 104 the image data accordingly. This analysis 104 comprises creating an array corresponding to the image data, each pixel of the array having an assigned brightness level. The maximum brightness level is set according to the maximum brightness of the light emitted from the headlights 30, 32. The analysis 104 may also comprise identifying a contrast within the image data.

Following the creation of the array, the image processing module compares 106 the brightness of the array to a predetermined first threshold. If this first threshold is not exceeded 108, then the system 12 categorises 110 the glare in the external environment into a lowest category. The lowest category of glare means that no further action needs to be taken 112 and the method 100 terminates.

It is expected that there may be anomalous points of brightness. Because of this, the comparison 106 incorporates a threshold to ensure that the brightness threshold is not exceeded if fewer than a predetermined number of pixels in the formed array exceed the brightness threshold. This predetermined number of pixels may correspond to an achievable resolution of the LED array 54. If an object is too distant, or very small pockets of brightness are detected, it may not be possible to change the distribution of the light so precisely. Therefore, it is useful to define a resolution of the LED array 54, the resolution being the smallest possible area for which a predetermined reduction in brightness can be achieved at a given distance by a change in brightness of at least one LED in the LED array 54.

It is expected that the system 12 would not immediately change the brightness of the LED array 54 in response to a highly reflective and distant area, as areas or objects that require the user's attention may otherwise be obscured from view because of the change in brightness of the LED arrays 54. In an embodiment of the invention, the system 12 may incorporate a distance sensor for this purpose.

Returning to the method 100 of FIG. 3, if the first threshold is exceeded 114, the image processing module 46 proceeds to the next step 116 in the method 100. At this step 116, the image data is assessed 116 by the image processing module 46 to identify if the brightness levels within the image data are concentrated into specific brightness levels or are distributed across the image data. If the image processing module 46 identifies 118 small, distributed pockets of brightness that are not concentrated then it is likely that the brightness is due to rain, hail or snow interfering with the headlight beam or that there is self-reflection from a part of the vehicle 10. The glare is categorised 120 as such and no further action is taken 112. The method 100 may be altered in the case of precipitation to incorporate a further step (not shown) that requires an area of brightness to have an increased area for the image processing module 46 to identify a reflective area in the image data at steps 106 and 116 of the method 100.

If the brightness levels are found to be concentrated 122 and this is not attributed to any precipitation or other adverse weather condition or fault in the system, then the position of the reflective areas are identified 124 in coordinate form by the image processing module 46. Areas of similar brightness are grouped together, to allow for greater distinction between reflective areas and to ensure that the glare can be correctly categorised later.

Following the identification 124 of the areas of brightness, further classification takes place. Every area that is not categorised as exceeding the first brightness threshold is assigned 126 the lowest level of glare and the method is terminated, as discussed above.

The brightness level for each remaining identified area is then compared 128 against a second threshold. If the brightness level of the reflective area is identified 130 as being between the first and second threshold (i.e. does not exceed the second threshold), then the glare from that area is categorised 132 as medium level, while if the brightness level is above 134 the second threshold, then the glare is categorised 136 as the highest level of glare by the image processing module 46.

With this information, the information concerning the brightness levels is communicated to the headlight control module 50, where it is correlated 138, 140 by the headlight control module 50 to the LED array 54. The headlight control module 50 then alters the LED array 54 using the correlation, and reduces 142, 144 the intensity of the beam accordingly. For areas categorised 136 as having the highest level of glare, the headlight intensity is reduced 142 by a first amount, and for areas categorised 132 as having medium level of glare, the headlight intensity is reduced by a second amount 144. The first amount is greater than the second amount. The first and second amounts are tailored such that a uniform illumination is achieved across the area in front of the vehicle 10.

It can therefore be seen that the method 100 may be separated out into four separate stages. Namely, obtaining an image 102, a first analysis and categorisation stage 146, a second analysis and categorisation stage 148 and an illumination adjustment stage 149 based on the first and second analysis stages. The first analysis stage 146 comprises steps 104 through 126, and performs an analysis whereby reflective objects that may potentially cause glare are differentiated from those that won't and categorised accordingly. The second analysis stage 148 comprises steps 128 to 132 and 136 and analyses the reflective objects that may cause glare, and categorises them accordingly. The adjustment stage 149 comprises correlating 138, 140 and reducing 142, 144 the headlight beam intensities accordingly. It will be appreciated that some of the steps shown in each stage may be performed elsewhere. For example, identification 124 of coordinates and correlating 138, 140 these coordinates to the beam may be performed at any point before reduction in headlight beam intensity 142, 144.

It is envisaged that the first threshold level will be set at 50% of a maximum brightness, and the second threshold level will be 80% of a maximum brightness. It is also envisaged that the thresholds and the headlight reductions may be linked, such that the headlight beam will be reduced by 50% for any area categorised as medium glare, and reduced by 80% for the highest level of glare areas.

The above threshold values are purely indicative, and may be altered to suit a specific situation. For example, embodiments of the invention may include first and second threshold levels set at 10%, 20%, 30%, 40%, 50%, 60%, 70%, 80% or 90% of a maximum brightness or any suitable proportion of a maximum brightness, provided that the second threshold level is greater than the first threshold level and that neither threshold level corresponds to the maximum brightness. Similarly, the headlight reduction associated with each categorisation may correspond to any reasonable proportion of the full power of the headlight beam and need not necessarily be the same proportion as the exceeded threshold level. In some embodiments, headlight beam reductions may be set within a reasonable range. For example, reductions of between 10% and 40% may correspond to exceedance of the first threshold, and between 40% and 70% for exceedance of the second threshold. These ranges may also overlap, and the reduction in the headlight beam may change within the range with respect to time. This would mean that upon identification of an area categorised as medium glare, the initial level of the headlight beam following reduction would not be the same as the level of the headlight beam immediately before the surface causing the glare is passed by the vehicle.

Alternatively, the system may reduce the intensity of the lights by stages, until the glare is reduced to an acceptable level below each of the thresholds. In some embodiments, the thresholds levels and the associated reductions in headlight beam can be iteratively tuned during vehicle use by the system, during vehicle set-up or when stationary by the user.

By repeating the method 100 of FIG. 3 continuously, the system 12 can ensure that the glare from reflective objects in the external environment is kept to a minimum while still ensuring the user is able to identify hazards and gather information from road signs. The system 12 continually monitors the surroundings to ensure that the there are no periods of sudden glare that could momentarily impair the user's vision, and to ensure that the headlight beams are restored to full intensities once the vehicle 10 has passed the reflective object.

Figure 4:
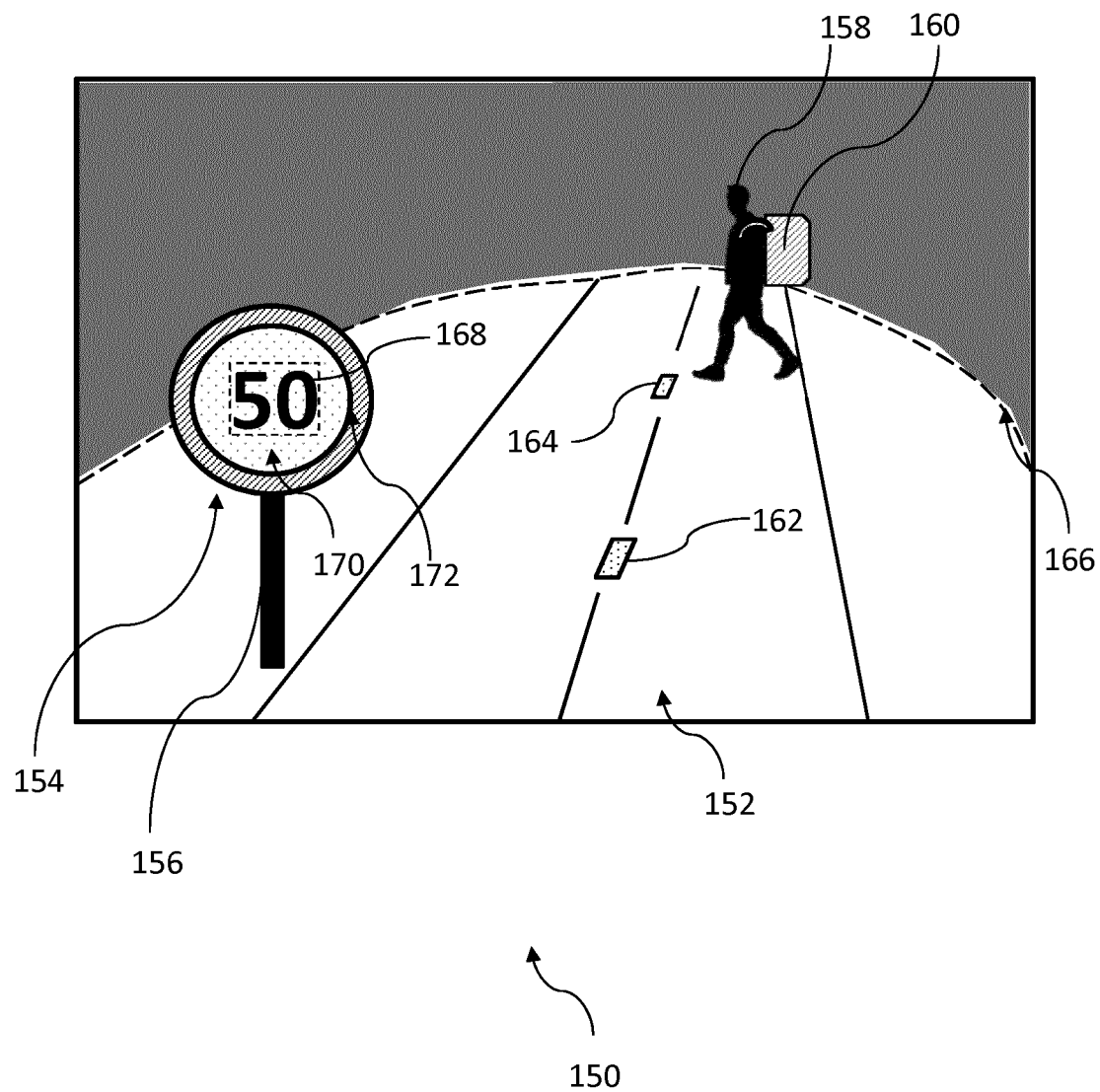
FIG. 4 is an example image formed from image data obtained for analysis by a camera forming part of an embodiment of the headlight system of the invention.

FIG. 4 is an illustrative image 150 of a scenario that may be captured by the camera module 44 of the system 12. A plurality of areas having different reflectivities shown in the image 150, the areas corresponding to objects in the external environment. Within the image 150 can be seen a road 152, a road sign 154 mounted on a pole 156 and a pedestrian 158 having a rucksack 160 in the road 152. The extent of the headlight beams, and therefore the field of vision of the camera 26 and of the driver is shown by a dashed line 166. The road sign 154 is reflective and has a number 168 having a low glare value, an inner portion 170 having a medium glare value and an outer portion 172 having a high glare value. The rucksack 160 of the pedestrian 158 has a high glare value.

During the method 100 of FIG. 3, the image processing module 46 would receive the image 150 of FIG. 4, and identify at step 106 that the image brightness does 114, at at least one position, exceed the first brightness threshold. At the next step 116 in the method 100, the image processing module 46 identifies 122 that the brightness is concentrated into specific regions, and so identifies 124 the coordinates of the reflective areas.

The system 12 will then assign 126 all areas that are not categorised as above the first threshold as low level glare, such as the road 152, the pedestrian 158, the number of the road sign 168 and the road sign pole 156. Areas that are assigned low level glare therefore correspond to surfaces that produce a low level of glare or no glare at all. The reflective areas are compared 128 to the second threshold. As listed above, the inner portion 170 of the road sign 154 will not exceed the second threshold, and will be categorised 132 as having a medium glare level according to the system's categorisation. The outer portion 172 of the road sign 154 and the rucksack 160 of the pedestrian 158 will be categorised 136 as having a high glare level. The headlight control module 50 will map 138, 140 the locations of these areas to the headlight LED array 54 and reduce 142, 144 the intensities of the headlight beams in the locations of these areas accordingly.

While the categorisation 132, 136 of the glare should allow the number 168 of the road sign 154 to be clearly distinguished while ensuring a minimum of glare, in some embodiments, the system 12 is able to clearly differentiate the number 168 of the road sign 154 and the surrounding inner portion 170 by altering the LED arrays 54 accordingly. For example, the system 12 may be operable to reduce the intensity of a portion of the headlight corresponding to the position of the surrounding inner portion 170 relative to the portion of the headlight corresponding to the number 168.

In other embodiments, in the event that the distribution of light radiated from the LED arrays 54 cannot be resolved sufficiently so as to outline particular information surrounded by reflective areas, the analysis 104 of the image 150 by the image processing module 46 incorporates a function that aids in identifying or is able to identify areas of low reflectivity and glare level that are completely surrounded by areas of higher reflectivity. This function may comprise a Gaussian blur, for example. Alternatively, as shown in FIG. 4 by the dashed box, the system identifies a rectangular or circular outline of a low level reflective area of an object such as the number 168 "50" and ensures that the intensity of that area of the object is lit with a full intensity beam. The size of the rectangle would correspond to a minimum resolution of the LED arrays 54 at least.

Further image processing techniques may take place to determine the levels of brightness or glare of individual areas identified within the obtained image, and their relevance to the driver. For example, it may be necessary to retain the reflection from cat's eyes 162, 164 depicted in FIG. 4 for safety reasons, and the system may process the image to identify the presence of cat's eyes.

An alternative scenario to consider is the action of the system 12 when approaching an oncoming vehicle, or when being overtaken by an overtaking vehicle. In both cases, the headlights 30, 32 are dimmed in response to the glare arising from the overtaking or oncoming vehicle, and this ensures that users of the oncoming or overtaking vehicle are not dazzled while reducing glare for the user of the vehicle 10 incorporating the lighting system 12. This would allow the user of the vehicle 10 incorporating the lighting system 12 to operate in full beam mode for much longer without having to regularly switch between full beam and dipped beam mode.

Many alternative embodiments of the vehicle 10 and the system 12 are possible without departing from the scope of the claims. In some embodiments, a plurality of cameras 26 are incorporated into the vehicle 10, allowing a wider image and better reduction in glare. A plurality of cameras 26 further improves depth perception of the system, allowing for the identification of reflective surfaces in three dimensional space rather than simply a two dimensional image.

In other embodiments, the image processing module 46 also comprises character-recognition software or edge detection software. Character recognition software allows an additional step in the method 100 where the image processing module 46, having identified 124 the reflective areas, attempts to identify any characters near to or within those areas. Upon recognition of this information, the image processing module 46 passes the information to a user display (not shown) disposed within an interior volume of the vehicle 10 to display to the user. The character-recognition software may also match the characters to known character groupings, such as speed limit numbers or place names, the place names being specified using a navigational system also disposed within the vehicle 10. Edge detection software allows detection of objects within the image 150 to allow swifter processing of the system. By detecting edges of areas through the analysis of the contrast within the image 150, the brightness analysis of the image 150 can be focussed on particular areas of the image 150 to quickly identify areas that are likely to contain high or medium levels of glare.

In other embodiments, the system recognises the position of the objects and alters the light accordingly. In some embodiments, by analysing the shape of an object, the system can identify other vehicles or road signs.

Many modifications may be made to the above examples without departing from the scope of the present invention as defined in the accompanying claims.

The invention claimed is:

1. A method for reducing headlight glare experienced by a user of a vehicle, the vehicle comprising a headlight system having at least one headlight operable to illuminate an environment external to the vehicle, the method comprising:
   illuminating the environment external to the vehicle;
   obtaining image data of the illuminated environment;
   performing a first analysis of brightness values of the image data to identify reflective surfaces that may cause glare, wherein performing the first analysis comprises comparing the brightness values to a first threshold and categorising surfaces corresponding to image data having brightness values which do not exceed the first threshold into a first category corresponding to a low level of glare and categorising surfaces corresponding to image data having brightness values which do exceed the first threshold as reflective surfaces that may cause glare;
   performing a second analysis of brightness values of the image data to categorise the identified reflective surfaces into at least two categories, the second analysis comprises comparing the brightness values of the image data corresponding to the reflective surfaces to a second threshold, categorising the reflective surfaces corresponding to image data having brightness values which do not exceed the second threshold into a second category corresponding to a medium level of glare and categorising the reflective surfaces corresponding to image data having brightness values which do exceed the second threshold into a third category corresponding to a high level of glare; and
   adjusting the light output from the at least one headlight in a direction of each identified reflective surface in dependence on the category of that reflective surface, wherein adjusting the light output from the at least one headlight comprises reducing a beam intensity of the at least one headlight by a first amount in a direction of reflective surfaces categorised into the second category, and reducing a beam intensity of the at least one headlight by a second amount in a direction of reflective surfaces categorised into the third category.

2. The method of claim 1, wherein the brightness values of the image data are indicative of intensity of light reflected from each surface.

3. The method of claim 1, wherein performing the first analysis comprises identifying reflective surfaces that correspond to precipitation and/or self-reflection and disregarding them as reflective surfaces.

4. The method of claim 1, wherein the second amount is greater than the first amount.

5. The method of claim 1, further comprising identifying a location of the reflective surfaces in relation to the vehicle by identifying coordinates of the corresponding brightness values within the image data.

6. The method of claim 5, further comprising correlating the identified coordinates of the brightness values with the at least one headlight.

7. A system controller for controlling a headlight system of a vehicle to reduce glare experienced by a user of the vehicle, the system controller comprising:
   an input for receiving image data of an illuminated environment external to the vehicle;
   a processing module arranged to perform a first analysis and a second analysis of brightness values of the image data, the first analysis being performed to identify reflective surfaces that may cause glare and the second analysis being performed to categorise the identified reflective surfaces into at least two categories, wherein the first analysis comprises comparing the brightness values to a first threshold, categorising surfaces corresponding to image data having brightness values which do not exceed the first threshold into a first category corresponding to a low level of glare, and categorising surfaces corresponding to image data having brightness values which do exceed the first threshold as reflective surfaces that may cause glare, and wherein the second analysis comprises comparing the brightness values of the image data corresponding to the reflective surfaces to a second threshold, categorising the reflective surfaces corresponding to image data having brightness values which do not exceed the second threshold into a second category corresponding to a medium level of glare, and categorising the reflective surfaces corresponding to image data having brightness values which do exceed the second threshold into a third category corresponding to a high level of glare;
   a control module configured to generate output signals, the output signals being arranged to adjust light output from at least one headlight of the headlight system in the direction of each identified reflective surface in the at least two categories, in dependence on the first and second analyses, wherein adjusting the light output from the at least one headlight comprises reducing a beam intensity of the at least one headlight by a first amount in a direction of reflective surfaces categorised into the second category, and reducing a beam intensity of the at least one headlight by a second amount in a direction of reflective surfaces categorised into the third category; and an output arranged to output the output signals to the at least one headlight of the vehicle.

8. The system controller of claim 7, wherein the brightness values of the image data are indicative of intensity of light reflected from each surface.

9. The system controller of claim 7, wherein the processing module is arranged, in the first analysis, to identify reflective surfaces that correspond to precipitation and/or self-reflection and to disregard them as reflective surfaces.

10. The system controller of claim 7, wherein the second amount is greater than the first amount.

11. The system controller of claim 7, wherein the processing module is configured to identify a location of the reflective surfaces in relation to the vehicle by identifying coordinates of the corresponding brightness values within the image data.

12. The system controller of claim 11, wherein the processing module is configured to correlate the identified coordinates of the brightness values with the at least one headlight.

13. A headlight system comprising:
at least one headlight operable to illuminate an environment external to a vehicle; and
the system controller of claim 7.

14. A vehicle comprising the controller of claim 7.

15. A computer-readable storage medium comprising instructions which, when executed on a system controller of a vehicle cause the system controller to carry out the method of claim 1.

* * * * *